(12) United States Patent
Cheng (10) Patent No.: US 6,256,746 B1
(45) Date of Patent: Jul. 3, 2001

(54) SYSTEM AND METHOD FOR MULTI-INPUT WAKE UP IN A MICROCONTROLLER USING A SINGLE CLOCK

(75) Inventor: Chuck C. Cheng, Saratoga, CA (US)

(73) Assignee: Ubicom, Inc., Santa Clara, CA (US)

( * ) Notice: Subject to any disclaimer, the term of this patent is extended or adjusted under 35 U.S.C. 154(b) by 0 days.

(21) Appl. No.: 09/127,700

(22) Filed: Jul. 31, 1998

(51) Int. Cl.[7] ........................................................ G06F 1/04
(52) U.S. Cl. .............................................................. 713/600
(58) Field of Search ..................................... 713/300, 310, 713/330, 323, 600

(56) References Cited

U.S. PATENT DOCUMENTS

| 4,965,550 | 10/1990 | Wroblewski | 340/524 |
| 5,355,503 | 10/1994 | Soffel et al. | 713/322 |
| 5,898,238 | 4/1999 | Dombrowski | 307/130 |

*Primary Examiner*—Thomas M. Heckler
(74) *Attorney, Agent, or Firm*—Fenwick & West LLP (57) ABSTRACT

A system and method for detecting multiple inputs, e.g., the asynchronous transition of a pin input or a synchronous input from the CPU, and enables either of the inputs to generate a wake up signal using a single clock signal. The invention also resolves conflicts between the multiple inputs while using the single clock signal.

7 Claims, 6 Drawing Sheets

SYSTEM AND METHOD FOR MULTI-INPUT WAKE UP IN A MICROCONTROLLER USING A SINGLE CLOCK

BACKGROUND OF THE INVENTION

1. Field of the Invention

This invention relates generally to semiconductor microcontrollers and more particularly to multi-input microcontroller wake up systems and methods.

2. Description of Background Art

Microcontrollers are microprocessors integrated with peripherals on a single integrated circuit. They are compact in size and yet retain the computational power of traditional microprocessors, allowing them to be used in a multitude of applications. For example, in a single household, microcontrollers are a part of microwave ovens, televisions, calculators, remote controls, clocks, etc. In a microwave oven, for example, the microcontroller senses the settings keyed in by the user and heats up food for the set time interval and power level. The microcontroller keeps track of real time and produces a notification signal, e.g., an audible tone, to notify the user when the heating is done. The microcontroller also displays the status of the microwave oven on a suitable display, typically an LCD or LED.

Microcontrollers are also used in automobiles. Every car has about twenty microcontrollers. In a car, microcontrollers are used in the engine control modules, the antilock braking systems, the sound systems, the airbags, and automobile suspension control modules, for example. In antilock braking systems, the microcontroller monitors the rotational speed of the tires through sensors attached to the tires. When the driver applies the brakes, the microcontroller determines whether any of the tires have locked. If any of the tires are locked, the microcontroller releases the brakes for that tire through a servo-mechanical device coupled to the brakes. Thus, the driver is able to steer the car during emergency braking situations without fear of having the tires lock and causing the car to skid or turn over.

A modern semiconductor microcontroller is a low-cost computer adapted to provide rapid solutions to external events after intensive computation. The microcontroller senses external events through signals received at input ports, and transmits responses to the events through its output ports. In order to provide this functionality, a typical microcontroller employs an on-chip Programmable Read Only Memory (PROM) to store its instructions, an on-chip data RAM to store the data temporarily, a Central Processing Unit (CPU) to execute the instructions stored in the PROM, an oscillator driver to generate the system clock, and other application-specific peripherals such as timers, interrupt handlers, watchdogs, analog comparators, etc The microcontroller is used in automobile keyless entry, toys, and keyboard. For automobile keyless entry, the microcontroller is the brain of the remote control. For most of the time, the microcontroller is in sleep mode to save power. When the user pushes a button on the keyless entry remote control, the action will wake up the microcontroller. Then, the microcontroller scans the buttons and identifies which button has been pushed. After identifying which button has been pushed, the microcontroller generates a corresponding command to the main keyless entry control unit in the vehicle. Then, the vehicle will perform the proper action.

Therefore, a system or method is needed to wake up the microcontroller from sleep mode when the user pushes any button out of many keys. The same principal applies to toys and keyboard. For most of the time, the microcontroller is in sleep mode to save power. When the user pushes a button on the toy or keyboard, the action will wake up the microcontroller. Then, the microcontroller scans the buttons and figures out which button has been pushed. After knowing which button has been pushed, the microcontroller will perform the proper action. The microcontroller may generate sound or movement for toys. It may pass the selected command to the main processor in a keyboard.

Therefore, a system or method is needed to wake up the microcontroller from sleep mode when the user pushes any button out of many keys of the toys or keyboard. This system is called multi-input wake up.

Conventional systems compare the current value of an input pin, e.g., PIN_INPUT, of the microcontroller with an old value, e.g., PIN_DATA, that has be stored (latched) when the pin has been previously read. If they do not match, an interrupt signal can be generated. An interrupt service routine processes the interrupt and clears the interrupt by storing the new value of the pin into a data latch. Thereafter, the value of the input pin and the value of the data latch match. However if the default value of the button in the keyboard is represented as a logical zero, for example, the action of pushing the button will generate a logical one. Then, PIN_DATA should be set to logical zero by reading PIN_INPUT which is equal to a logical zero when the button is at default state. The microcontroller then goes into sleep mode to save power.

Other conventional systems requires the generation of two non-overlapping clock signals, e.g., CLKA and CLKP, from one or more clock sources to set a pending flag (WK_PND) representing the whether a valid signal transmit on a pin has been detected. The first clock signal, CLKA, is used by the ALU to write to the pending flag, WK_PND. The second clock signal, CLKP, is used by the edge detection circuit to set the pending flag when an input is received on the pins of the microcontroller, for example. The use of two clocks is necessary to avoid a conflict between an simultaneous ALU write operation to the pending flag and an edge detection write operation to the pending flag.

The use of multiple clocks to prevent potential conflicts is expensive in terms of the potential operating frequencies of the device, e.g., a microcontroller or microprocessor. The use of multiple clocks is inconsistent with more recent design methodologies that use a single clock signal for all of the registers on a chip. This is called single clock synchronous design methodology and allows the chip to operate at a higher frequencies when compared to designs using multiple clocks. In addition, the use of a single clock reduces the design cycle of semiconductor devices because the clocking scheme is not as complex.

What is needed is a system and method for using a single clock that is capable of receiving multiple inputs—some or all of which may be asynchronous—for example, a CPU and pins, detection transitions on these multiple inputs, ensuring that conflicts between the received signals are resolved, and generating a wake up signal in response to a transition in one of the multiple inputs.

SUMMARY OF THE INVENTION

The invention is a system and method for detecting multiple inputs, e.g., the asynchronous transition of a pin input or a synchronous input from the CPU, and enables either of the inputs to generate a wake up signal using a single clock signal. The invention also resolves conflicts between the multiple inputs while using the single clock signal.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
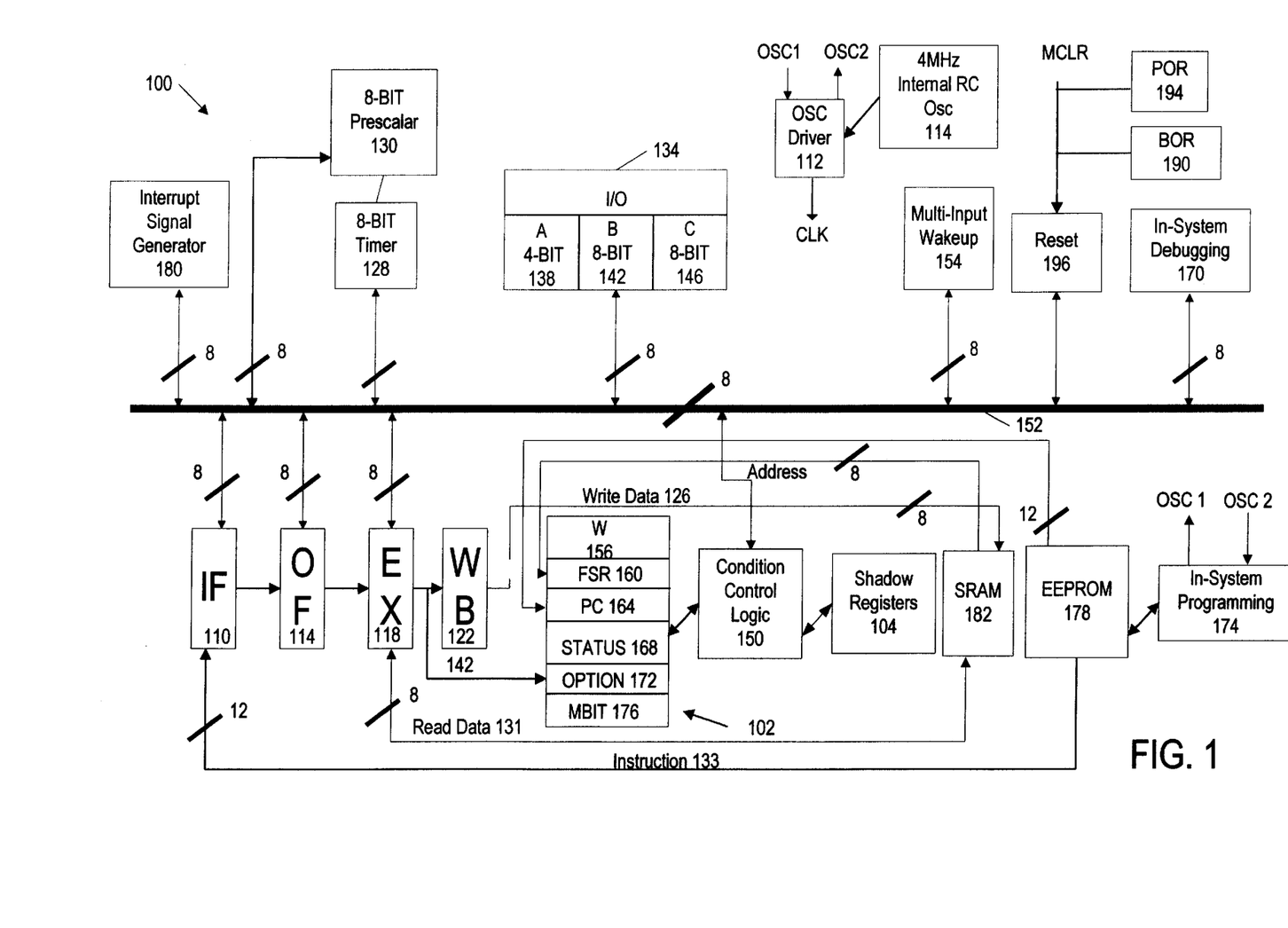
FIG. 1 illustrates one embodiment of a microcontroller 100 according to the present invention.

FIG. 1 illustrates one embodiment of a microcontroller 100 according to the present invention. An oscillator driver 112 (OSC) is coupled to an external reference to provide a system clock for the microcontroller 100. The external references are typically crystal oscillators, resonators, or resistors and capacitors depending on the oscillation mode chosen. OSC 112 also distributes a 4 MHz clock generated by the 4 MHz Internal RC (Resistor & Capacitor) Oscillator 114, when this frequency is required. The output of OSC 112 is coupled to the components on the microcontroller 100, e.g. multi-input wakeup 154 and EEPROM 178 via a conventional clock tree in the microcontroller. For clarity, this tree is not illustrated in FIG. 1.

An interrupt signal generator 180 generates and responds to interrupts. The interrupt signal generator 180 is a logic circuit designed on chip to perform the conventional interrupt handling functions of the microcontroller 100. Upon receiving an interrupt request, the interrupt signal generator 180 stops the normal execution of a program, and stores the return address to the breakpoint of the main program into a conventional interrupt stack. Then, the interrupt signal generator 180 initiates an interrupt service subroutine (ISR) stored in program memory 178. The interrupt signal generator 180 also generates an interrupt enter signal in response to initiating the interrupt service routine which is transmitted to the conditional control logic 150, described below. Upon completing the ISR, the interrupt signal generator 180 initiates the resumption of the execution of the main program. The interrupt signal generator 180 generates an interrupt exit signal upon completing the ISR, which is also transmitted to the conditional control logic 150.

Various components of the microcontroller 100 may be sources for causing the interrupt signal generator 180 to generate an interrupt. The 8-bit timer (TMR) 128 causes an interrupt upon timing down and is available for any general purpose. Thus, programs which provide for interrupts may use TMR 128 to generate an interrupt signal a certain amount of time after an event occurs. An 8-bit prescalar 130 is coupled to TMR 128 and divides the clock signal by a set number before passing the clock signal to TMR 128. A watch dog timer 126 is coupled to the 8-bit prescalar 130 and generates a reset signal in response to irregular activities such as the occurrence of an infinite loop in a program or when the CPU enters an invalid state, for example.

The I/O port 134 has three individual ports A, B, and C. These ports 138, 142, 146 are general-purpose input/output ports. Port A 138 is 4 bits wide while Port B 142 and Port C 146 are 8 bits wide. Each pin of the ports 138, 142, 146 may be set to receive data or transmit data. The Multi-input Wakeup circuit 154 samples the transition of the pins of Port B 142. If an interrupt is enabled and the microcontroller 100 is not in SLEEP mode, an edge transition at Port B 142 causes an interrupt. This allows external components to cause an interrupt to the microcontroller 100. If the microcontroller 100 is in SLEEP mode, however, the transition wakes up the microcontroller 100. The operation of the multi-input wakeup circuit 154 is described in greater detail below.

An In-System debugging circuit 170 (ISD) interfaces with an external debugging system, and is a third mechanism for generating interrupts. Responsive to the commands the ISD 170 receives from the external debugging system, the ISD 170 inserts breakpoints, reads and writes internal microcontroller registers, and performs single-step iterations through routines. At the inserted breakpoints, ISD 170 may request interrupts to be generated.

A brown out reset circuit 190 generates a reset signal to the reset unit 196 when the voltage supply dips below a preset value. The reset unit 196 generates a reset signal that resets the microcontroller. A power-on reset unit 194 generates a reset signal to the reset unit 196 when microcontroller initially powers up. The reset unit 196 can also receive a manual reset signal (manual clear—mclr) from an external pin.

The remaining circuits in FIG. 1 perform the processing of the microcontroller 100, as well as the remaining interrupt handling functions. In-System programming circuit 174 (ISP) interfaces with external programmers. Through the clock pins OSC1 and OSC2, ISP 174 communicates with the outside world serially. Responsive to the commands ISP 174 receives from external programmers, ISP 174 erases, programs or reads the Electrical Erasable Programmable Read Only Memory 178 (EEPROM) program memory. The ISP 174 allows the microcontroller 100 to be programmed even when the ISP 174 is already soldered and installed in the final end-user system.

An EEPROM 178 is used as program memory and is typically non-volatile semiconductor storage cells for storing program instructions for the microcontroller 100. In the preferred embodiment each cell is 12 bits wide. For example, the interrupt service routine is stored in EEPROM 178. The EEPROM 178 monitors changes in the PC address. If any bit of the PC address pointer changes value, the EEPROM 178 powers up and outputs the instruction pointed to by the new PC address. Otherwise, the EEPROM 178 stays powered down.

The Static Random Access Memory 182 (SRAM) is addressable data space. The SRAM 182 is a synchronous RAM and samples the control signals Read 131 (RD) and Write 126 (WE) at the rising edge of the system clock (CLK). When SRAM 182 senses either WE 126 or RD 131 or both are active, the SRAM 182 performs either a Write Operation or a Read Operation or both. The SRAM 182 functions as the register file for the microcontroller 100 and stores the temporary data.

The microcontroller 100 uses special function registers 102 for storing critical microcontroller status data regarding the current state of the microcontroller 100. These primary registers 102 allow the microcontroller 100 to store the critical information on chip. Program Counter 164 (PC), Accumulator 156 (W), CPU status register 168 (STATUS), and data memory address pointer 160 (FSR) are four such primary registers 102 used by the microcontroller 100. W 156 is used by many instructions as one of the operands. FSR 160 stores the SRAM address pointer information. PC 164 is the program counter and is used to point at the next instruction to be fetched. STATUS 168 is a status register indicating the current status of the microcontroller's processing and the peripherals. Other primary registers include OPTION 172, which is a control register used to configure the microcontroller, and MBIT 176, which is a commonly used temporary register. The primary registers 102 together store the data used to resume normal operation of a main program after receiving an interrupt. The data within the primary registers 102 should be stored at the time of interrupt because during the execution of the interrupt service routine, new data is written to those registers 102. Thus, in order to preserve the state of the microcontroller 100 prior to the interrupt being executed, the data contained within some or all of the primary registers 102 must be saved.

Condition control logic 150 is coupled to the primary registers 102 and the bus 152. Shadow registers 104 are coupled to several of the primary registers 102 through condition control logic 150. Condition control logic 150 stores the values in selected primary registers 102 into corresponding shadow registers 104 in response to receiving an interrupt enter signal from the interrupt signal generator 180. Condition control logic 150 restores the values of the selected primary registers 102 from the corresponding shadow registers 104 responsive to receiving an interrupt exit signal from the interrupt signal generator 180. Thus, important microcontroller status data is automatically saved and restored on chip, with minimal delay. Greater details of the interrupt handling circuitry are given below. A more detailed description of the interrupt handling operation is set forth in the pending U.S. patent application Ser. No., 09/121201, entitled "Single Cycle Transition Pipeline Processing Using Shadow Registers", filed on Jul. 22, 1998 by Chuck Cheuk-wing Cheng, which is incorporated by reference herein in its entirety.

The pipeline stages 110, 114, 118, 122 of the microcontroller 100 are coupled to SRAM 182 and EEPROM 178. In this embodiment, there are four stages: Instruction Fetch 110 (IF), Operand Fetch 114 (OF), Execution 118 (EX) and Write Back 122 (WB). The interrupt handling circuit of the present invention may be used with a microcontroller operating in the above configuration, or other configurations such as having a different number of pipeline stages, generating interrupts under different conditions, using different clocks or references, or using different types of memory, with equal effectiveness.

Figure 2:
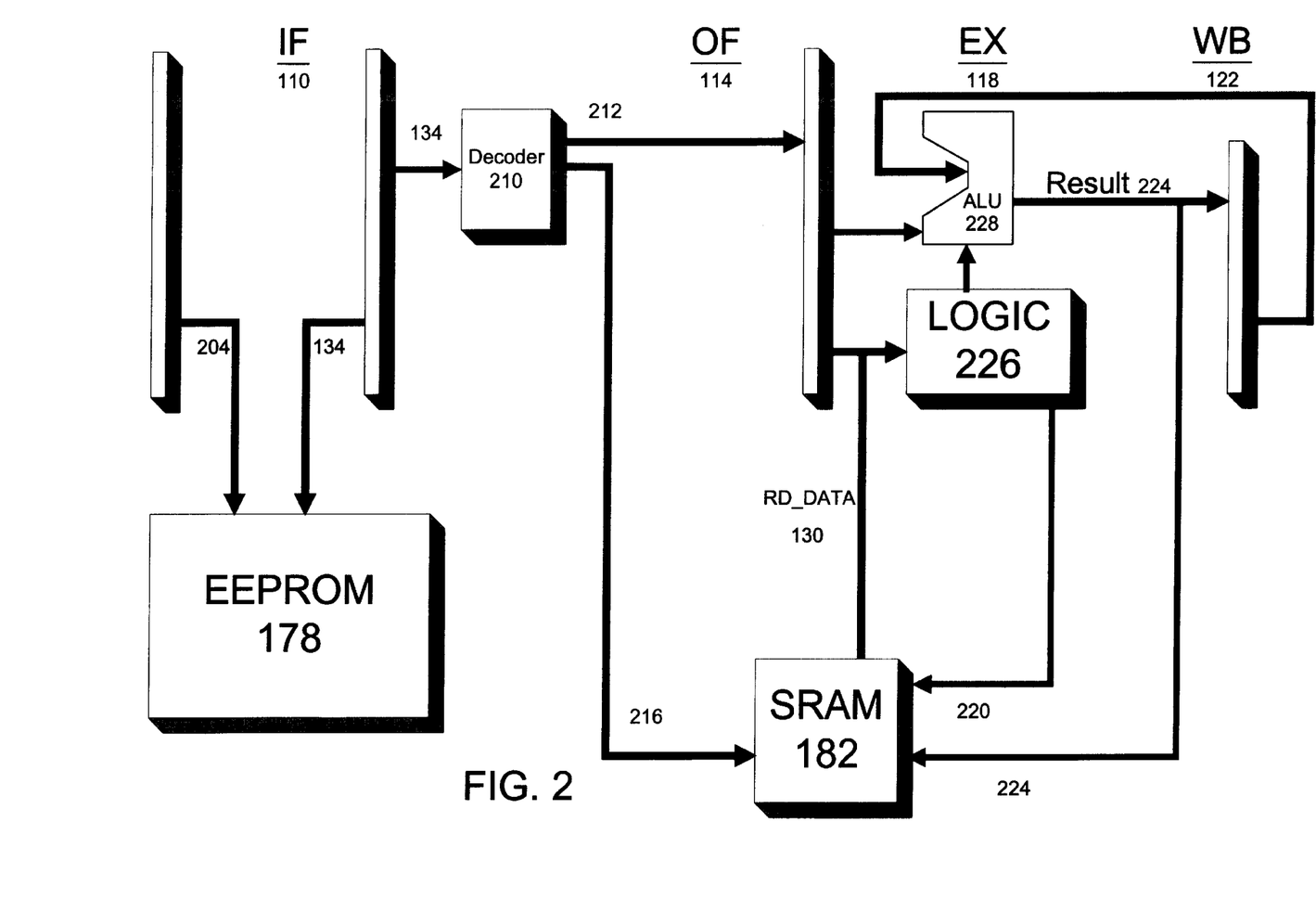
FIG. 2 is a more detailed illustration of the pipeline operation according to one embodiment of the present invention.

FIG. 2 is a more detailed illustration of the pipeline operation according to one embodiment of the present invention. The IF stage 110 accesses the EEPROM 178 using the address 204 given by the PC 164 to fetch the next instruction to be executed. The IF stage 110 transmits the instruction word 134 to the OF stage 114 on the next system clock rising edge. The OF stage 114 performs a preliminary decoding of the instruction word 134 using a decoder 210 and transmits the decoded signals 212 to the EX stage 118. Responsive to the results of decoding, the OF stage 114 begins any time-consuming operations, such as reading data from data memory 182. Other operations are decoded prior to being transmitted to the EX stage 118, including writing to memory, performing ALU operations, receiving or transmitting data through the input/output ports, or changing status flags. Each instruction word 134 is decoded into tens of control signals and each of these control signals enables a specific task. Since this pre-decoding reduces the time required to fully decode the instruction in the EX stage 118, the EX stage 118 has more time to perform the actual operation. The OF stage also generates the read address and RD signal 216 to set up the read operations to SRAM 182.

The EX stage 118 has an arithmetic logic unit (ALU) 228 inside and performs many of the ALU operations. ALU operations include addition, subtraction, shift-left, shift-right, etc. Also, the EX stage 118 generates the write address and WE signal 220 to set up the write operation to SRAM 182. The EX stage 118 also writes the results 224 of the ALU calculations to flip-flop based registers such as W 156, FSR 160, and STATUS 168 for example.

The WB stage 122 performs the write operation to SRAM 182 and writes the ALU result data 224 to SRAM 182. A more detailed description of the pipeline operation is set forth in the pending U.S. patent application Ser. No., entitled "Pipeline Processing for a Microcontroller", filed on Jul. 22, 1998 by Chuck Cheuk-wing Cheng, which is incorporated by reference herein in its entirety.

The present invention is capable of receiving asynchronous signals from multiple sources, e.g., the pins, along with synchronous signals, e.g., from the ALU 228, and generates a wake up signal. The present invention utilizes a single clock signal (CLK). Since the received signals are asynchronous, that is, a signal triggering a wake up signal can occur at any time and is independent of the clock cycle, the signals can attempt to trigger conflicting actions. For example, the ALU 228 may want to set a bit in a register, e.g., a pending bit, to a first logical value, while a second signal may attempt to set the same bit to the opposite logical value. If the first and second bits occur simultaneously the conflict must be resolved. The present invention also identifies the edge of one or more of the multiple signals which permits the invention to prevent multiple invocation of wake up signals.

Figure 3:
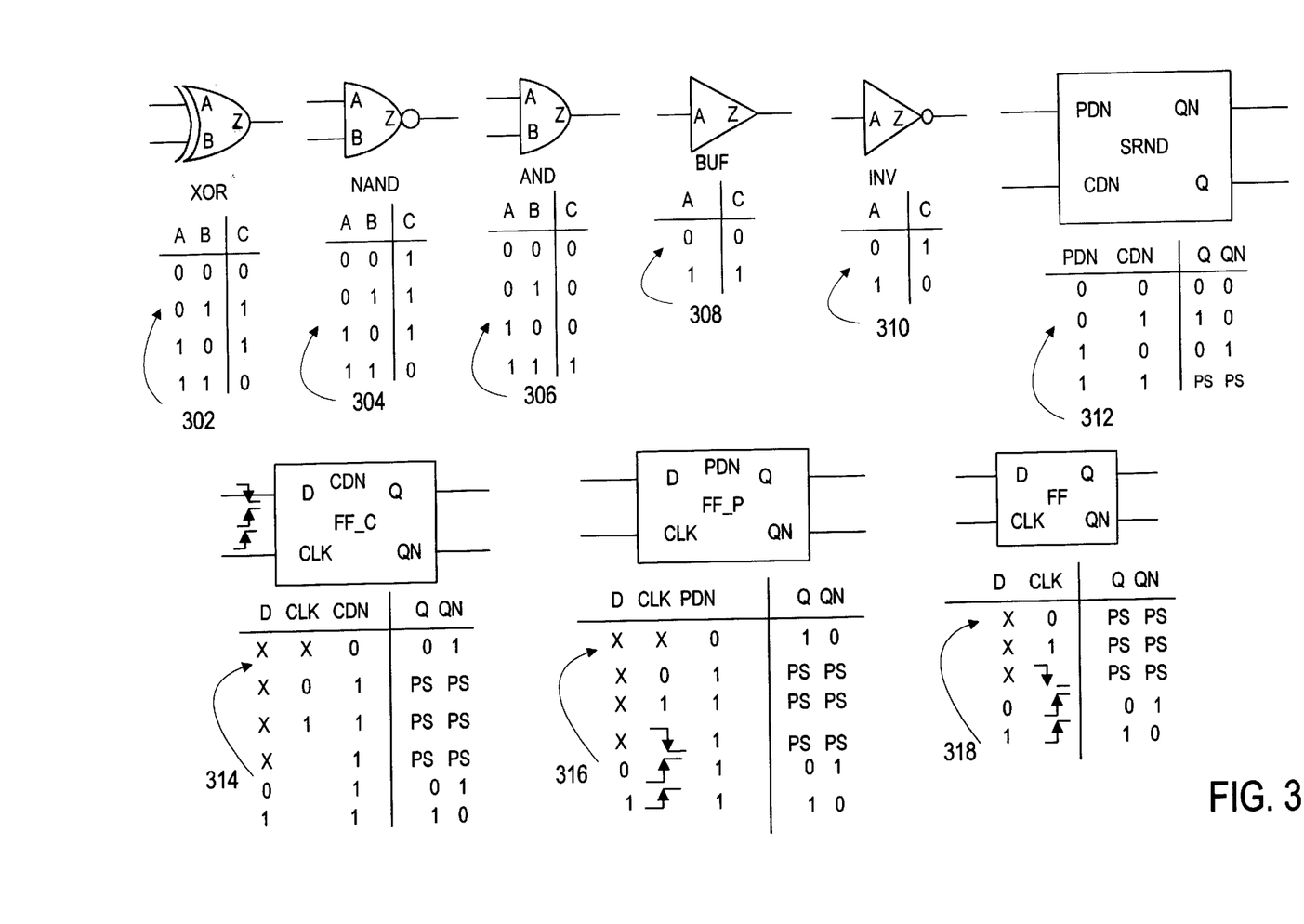
FIG. 3 is a description of some of the basic logic gates used in one embodiment of the present invention.

FIG. 3 is a description of some of the basic logic gates used in one embodiment of the present invention. The exclusive-OR (XOR) logic block 302 outputs a logical one only when the inputs A and B have different values. The AND gate 304 outputs logical one only when both A and B are logical one. The NAND gate 302 is the inverse of the AND gate 304. The buffer gate (BUF) 308 outputs the received logical value without change. The inverse gate (INV) 310 inverts the logical value of the input. The Set-Reset latch (SRND) 312 receives two signals, PDN and CDN. When both PDN and CDN are logical zero, the outputs Q and QN are both logical zero. When PDN and CDN are 0 and 1 respectively, Q and QN are 1 and 0 respectively. When PDN and CDN are 1 and 0 respectively, Q and QN are 0 and 1 respectively. When both PDN and CDN are 1, Q and QN will maintain their previous state.

The positive clock edge flip-flop (FF_C) 314 receives signals three signals, D, CLK, and PDN. The data at pin D will be latched into the output pin Q and QN at positive clock edge (CLK). The Q and QN will maintain the state in all other conditions except when the CDN pin is 0. When CDN pin is 0, the Q and QN will change to 0 and 1 immediately.

Another positive clock edge flip-flop (FF_P) 316 receives three signals, D, CLK, and PDN. The data at pin D of FF_P 316 is latched into the output pin Q and QN at a positive clock edge. The Q and QN will maintain the state in all other conditions except when the PDN pin is 0. When PDN pin is 0, the Q and QN will change to 1 and 0 immediately.

Another positive clock edge flip-flop (FF) 318 receives two inputs, D and CLK, and generates two outputs, Q and QN. The data at pin D will be latched into the output pin Q and QN at positive clock edge. The Q and QN will maintain the state in all other conditions.

Figure 4:
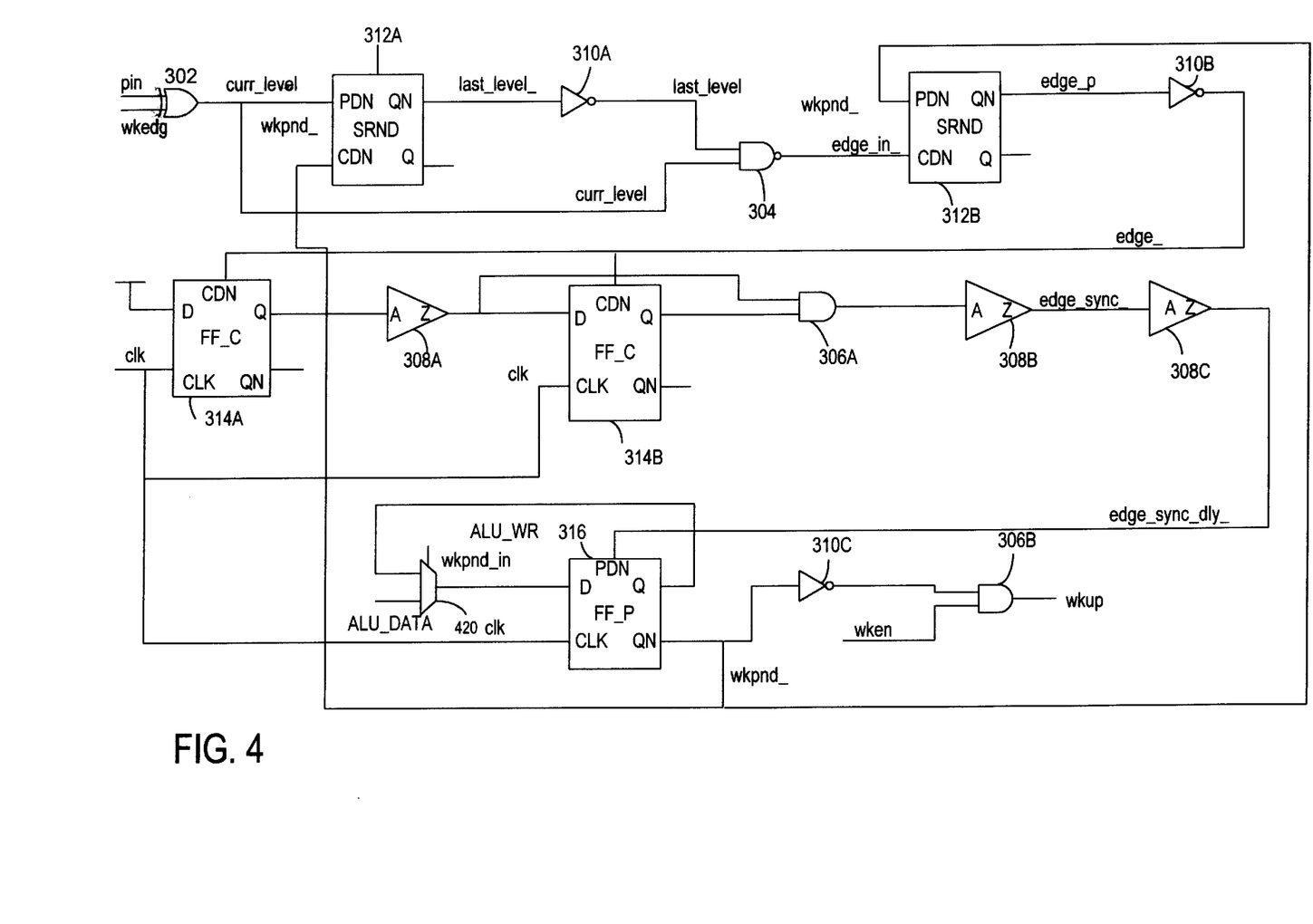
FIG. 4 is a logic level schematic of one embodiment of the present invention.

FIG. 4 is a logic level schematic of one embodiment of the present invention. It will be apparent to one skilled in the art that alternate designs can be used without departing from the present invention. NAND gate 302 receives two input signals, pin and wkedg. The input signal pin represents the signal received from one of the multiple inputs, e.g., an external pin, for example. The input signal wkedg indicates whether rising edge or falling edge of the pin signal will trigger the wake up. In this example, when wkedg is logical 0, the rising edge will trigger the wake up. When wkedg is logical 1, the falling edge will trigger the wake up.

The output of the NAND gate 302 is received at the PDN input of a first SRND 312A. The first SRND 312A receives an inverted wake-up pending signal (wkpnd_) at its CDN input. The wkpnd_ signal represents the inverse of a wake up pending bit. The output signal (last_level_) of the first SRND 312A is logical zero when it indicates that the base level of the targeted transition has been reached. For example, if the wkedg signal is zero, the invention identifies for a positive edge transition, e.g., the transition from a logical zero to logical one. In this example, the low logic level in the pin represents the base level of the transition. A low level on the pin enable the last_level to be active.

The first inverter receives the last_level_ signal and outputs a last_level signal. NAND gate 304 compares two signals representing the normalized value of the pin signal (e.g., the signal output by XOR gate 302) before the most recent pin transition (last_level) and the current normalized value of the pin signal (curr_level). The NAND gate 304 generates an output signal (edge_in_) representing whether the current level of the pin signal are both equal to a logical 1 (edge_in_=0 if both signals are equal to a logical 1). A second SRND 312B receives the edge_in_ signal and the wkpnd_ signal as inputs and generates an edge_p signal on its QN output. The edge_p signal represents a latched signal indicating when a valid transition on the pin is detected. A second inverter 310B inverts the edge_p signal to generate an edge_ signal that is received at the CDN input of a first FF_C device 314A and a second FF_C device 314B. The D input of the first FF_C device is set to a high logic level. The CLK input receives the clock signal.

The output of the first FF_C 314A is received by a first buffer 308A and a first AND gate 306A. The output of the first buffer 308A is received at the D input of the second FF_C device 314B and the clock signal is received at the CLK input of the second FF_C device 314B. The Q output of the second FF_C device 314B is also received by the first AND gate 306A. A second buffer 308B receives the output of the first AND gate 306A and generates an edge_sync_ signal that is received by a third buffer 308C which generates an edge_sync_dly_ signal that is received at the PDN input of the FF_P device 316. The FF_P device also receives a wkpnd_in signal at its D input and the clock signal at its CLK input. The wkpnd_in signal represents the output of the multiplexor (MUX) 420. MUX 420 sends either the Q value of FF_P 316 or data from the ALU 228 (ALU_DATA) to the D input of the FF_P 316 based upon the value of ALU_WR that represents whether the ALU 228 is writing data to the pending bit (wkpnd). The QN output of the FF_P device 316 is the wkpnd_ signal that is received at the CDN input of the first SRND 312A, at the PDN input of the second SRND 312B (as described above) and at a third inverter 310C. A second AND gate 306B receives the output of the third inverter 310C and a wake up enable signal (wken) and outputs a wake up signal (wkup).

Figure 5:
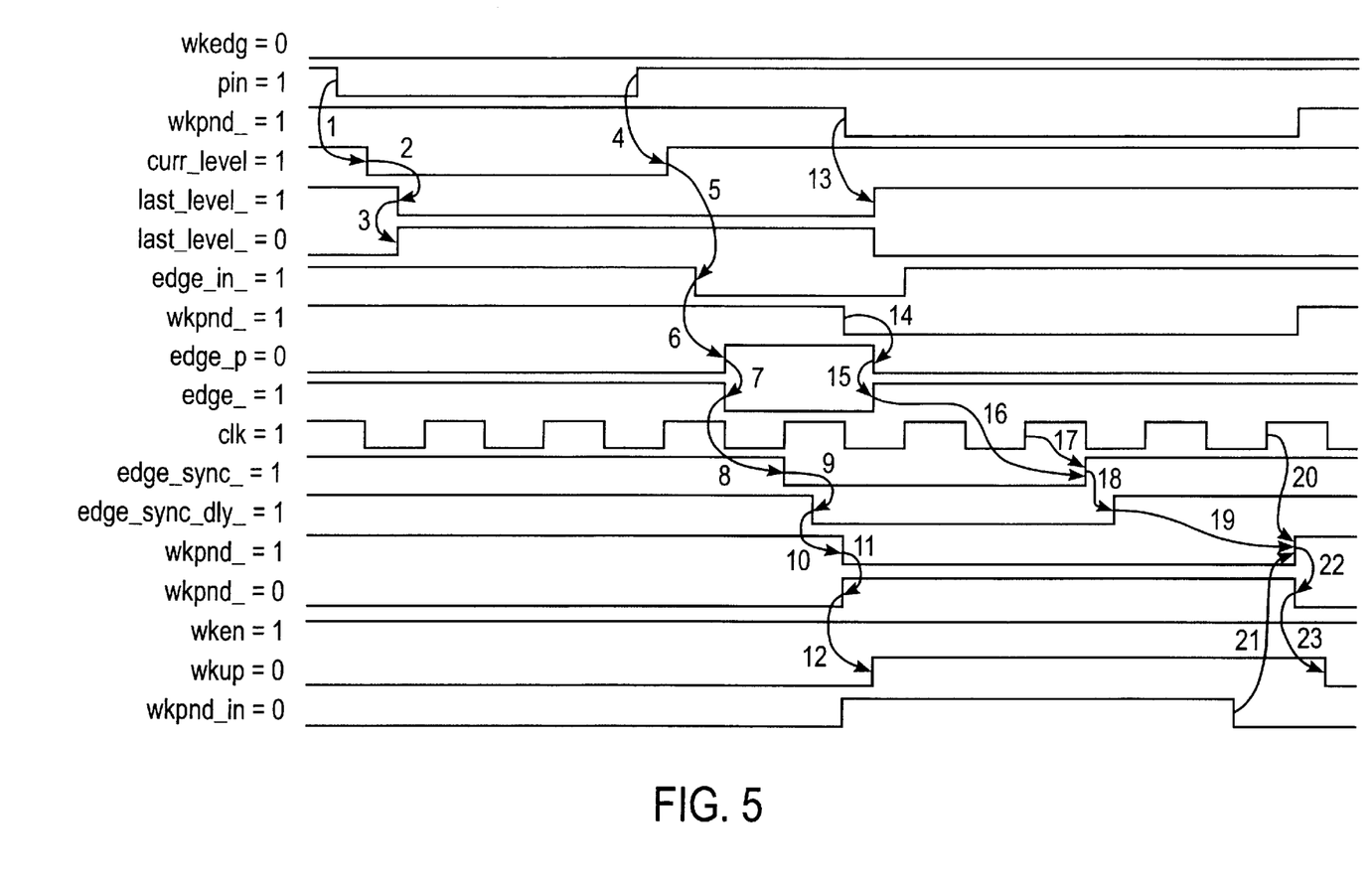
FIG. 5 is a timing diagram illustrating the states of various signals in one example according to the embodiment illustrated in FIG. 4.

FIG. 5 is a timing diagram illustrating the states of various signals in one example according to the embodiment illustrated in FIG. 4. As indicated above, the wkedg signal determines whether a rising edge or a falling edge of the pin signal triggers the wake up. In FIG. 5, wkedg is 0 and, therefore, the rising edge of the pin signal triggers wake up.

Transition 1 in FIG. 5 indicates when a pin goes from a logical 1 to a logical 0 and the curr_level signal transitions from a logical 1 to 0. At transition 2 curr_level goes from a logical 1 to 0, and last_level_ goes from a logical 1 to 0 because the wkpnd_ signal is a logical 1. At transition 3, when the last_level_ signal transitions from a logical 1 to 0 and the last_level signal transitions from a logical 0 to 1. Accordingly, the first SRND 312A latches the falling edge of the pin signal. Now, the circuit is ready to detect the rising edge of the pin signal.

At transition 4, the pin signal transitions from logical 0 to 1 and the curr_level signal also transitions from a logical 0 to 1 after a propagation delay. At transition 5, when the curr_level signal transitions from a logical 0 to 1 the edge_in signal transitions from a logical 1 to 0 because last_level signal is already a logical 1. At transition 6, when the edge_in_ signal transitions from a logical 1 to 0 the edge_p signal transitions from a logical 0 to 1 because the wkpnd_ signal is a logical 1.

At transition 7, when the edge_p signal transitions from a logical 0 to 1 the edge_ signal transitions from a logical 1 to 0. At transition 8, when the edge_ signal transitions from a logical 1 to 0, the two FF_C flip-flops 314A, 314B will be reset to a logical 0 immediately and the edge_sync_ signal transitions from a logical 1 to 0. At transition 9, when the edge_sync_ signal signal transitions from a logical 1 to 0 the edge_sync_dly_ signal transitions from a logical 1 to 0. At transition 10, when the edge sync_dly_ signal transitions from a logical 1 to 0, the FF_P flip-flop 316 will be preset to a logical 1 immediately and the wkpnd_ signal transitions from a logical 1 to 0.

At transition 11, when the wkpnd_ signal transitions from a logical 1 to 0 the wkpnd signal transitions from a logical 0 to 1. At transition 12, when the wkpnd signal transitions from a logical 0 to 1 the wkup signal transitions from a logical 0 to 1 because the wake up enable signal (wken) is a logical 1.

Accordingly, the FF_P device 316 latches the rising edge of the pin signal and generates the wkpnd_ signal and consequently the wake up signal (wkup). The wkup signal is output to the interrupt and reset logic of the microcontroller as described below with reference to FIG. 6.

At transition 13, when the wkpnd_ signal transitions from a logical 1 to 0 the last_level_ signal transitions from a logical 0 to 1 because the curr_level signal is a logical 1. At transition 14, when the wkpnd_ signal transitions from a logical 1 to 0, the edge_p signal transitions from a logical 1 to 0. At transition 15, when the edge_p signal transitions from a logical 1 to 0, the edge_ signal transitions from a logical 0 to 1. At transition 16, when the edge_ signal transitions from a logical 0 to 1, the first and second FF_C flip-flops 314A, 314B will not be affected by the edge_ signal since its value is a logical 1. Instead the first and second FF_C flip-flops 314A, 314B will change based on the signal at their D input at the rising clock edge. At the first rising clock edge after the edge_ signal transitions to a logical high state, the Q output of the first FF_C flip-flop 314A transitions to a logical high state. At the second rising clock edge after the edge_ signal transitions to a high logical state, the Q output of the second FF_C flip-flop 314B transitions to a high logical state. After some delay, transition 17 occurs and the edge_sync_ signal transitions to a logical high state.

The present invention is implemented such that the wake up will not be repeatedly triggered. In the embodiment illustrated in FIG. 4, once the wake up is generated it will not be repeated.

At transition 18, when the edge_sync_ signal transitions to a logical high state, the edge_sync_dly_ signal transitions high. At transition 19, when the edge_sync_dly_ signal transitions from a logical 0 to 1, the FF_P flip-flop 316 is no longer affected by the edge_sync_dly_ signal since it is at a logical 1. Changes to the FF_P flip flop QN output, i.e., the wkpnd_ signal, is based upon the value of the FF_P's 316 D input at the rising clock edge. If a second input signal, e.g., from the ALU of the microcontroller, wants to clear the wake up pending bit (wkpnd_), it can set the signal wkpnd_in to a logical zero. At the first rising clock edge after the wkpnd_in signal transitions to a logical low state, the QN output of the first FF_C flip-flop 314A transitions high. This corresponds to transitions 20 and 21.

At transition 22, when the wkpnd_ signal transitions high, the wkpnd signal transitions low. At transition 23, when the wkpnd signal transitions low, the wkup signal transitions low. This allows the wake up circuit to trigger the FF_P flip-flop 316 when there is a rising edge on the pin signal and also allows the ALU to clear the FF_P flip-flop 316 using the same system clock. When both events happen simultaneously, the wake up circuit has higher priority over ALU write in the preferred embodiment. Alternatively, the ALU write command has priority over the wake up circuit.

Figure 6:
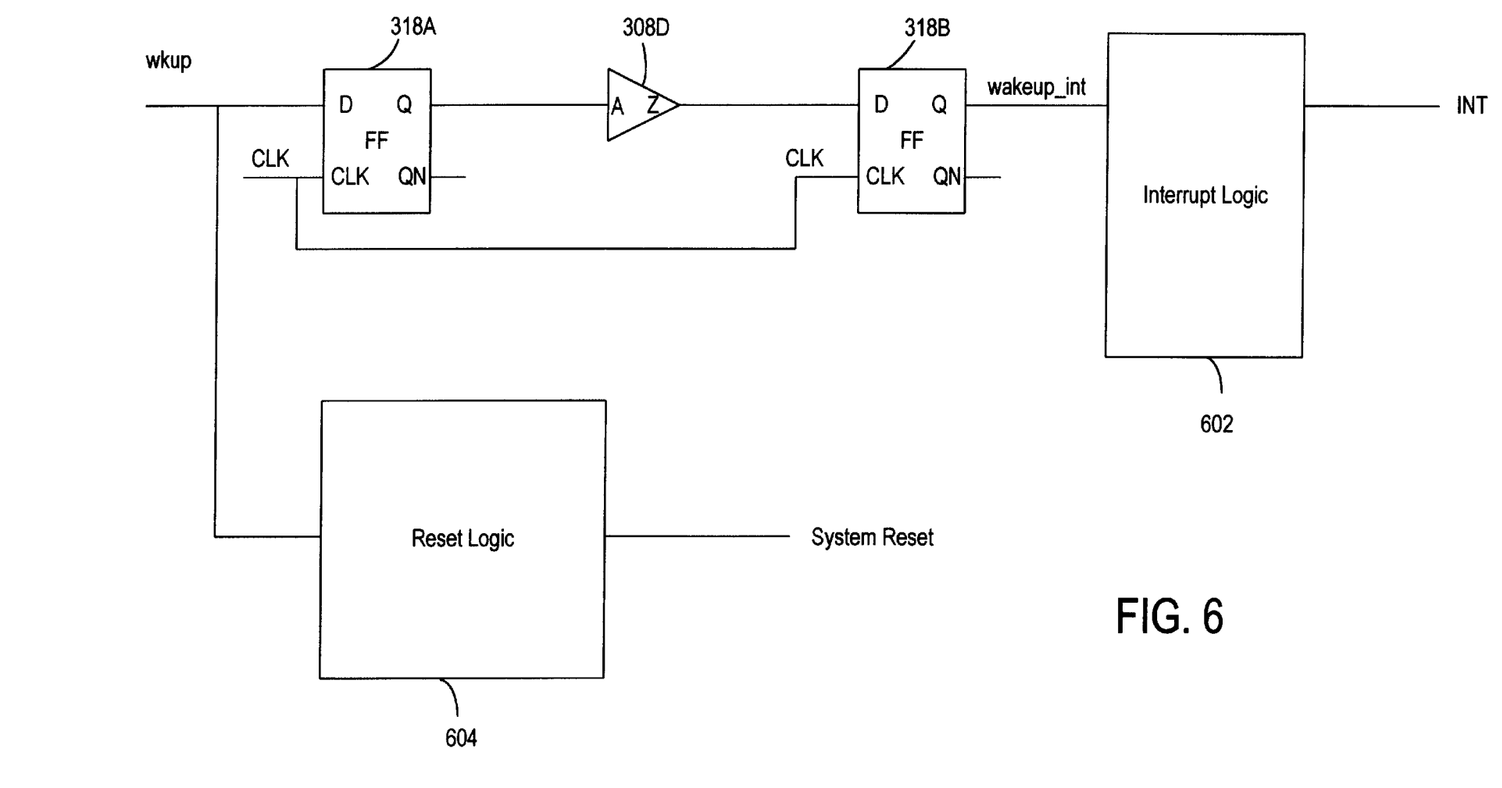
FIG. 6 is an illustration of the wake up interrupt and the reset logic according to one embodiment of the present invention.

FIG. 6 is an illustration of the wake up interrupt and the reset logic according to one embodiment of the present invention. The wake up signal (wkup) is received by a first flip flop (FF) 318A and by a reset logic unit 604. FF 318A also receives the clock signal (CLK). A fourth buffer 308D receives the Q output of the first FF 318A and outputs a signal to the D input of a second FF 318B. The second FF 318B generates a wake up interrupt signal (wakeup_int) at its Q output. The wake up signal (wkup) described above is received by the reset logic unit 604 to wake up the chip from sleep mode. The reset logic unit 604 generates a system reset when the chip is in sleep mode. When generating a system reset the wkup signal does not need to be synchronized.

In addition, the wkup signal is synchronized and generates an interrupt to the microcontroller when the chip is not in sleep mode. When the wkup signal is used to generate an interrupt signal, the chip is still operating in conjunction with the system clock. Therefore, the present invention synchronizes the asynchronous wake up signal before the wake up signal is received by the interrupt logic 602.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A system for generating a wake up signal based upon at least two input signals, comprising:
   a clock;
   a CPU; and
   a multi-input wake up unit having:
      receiving means for receiving a first input signal from a first device and a second input signal from a second device, said first input signal being asynchronous;
      resolution means for resolving a conflict between said first and second input signals to identify a higher priority signal; and
      wake up means for generating a wake up signal in response to said higher priority signal, said wake up signal received by said CPU.

2. A system for generating a wake up signal based upon at least two input signals, comprising:
   a clock;
   a CPU; and
   a multi-input wake up unit having:
      a signal transition identifier, for receiving two input signals and for identifying signal transitions of said two input signals;
      a conflict resolver for identifying a higher priority signal of said two or more input signals; and
      a wake up generator for generating a wake up signal in response to the higher priority signal received from the conflict resolver, said wake up signal received by said CPU.

3. The system of claim 2, wherein said conflict resolver further comprises:
   a first XOR gate, receiving a first input signal and a second input signal, for performing an XOR operation on said first and second input signals and generating a first output signal;
   a first set-reset latch, receiving said first output signal on a first PDN input, receiving a third QN output signal, for performing set-reset latch operation to generate a first QN output signal;
   a first inverter, receiving said first QN output signal, for performing an inversion operation to generate a second output signal;
   a NAND gate, receiving said first and second output signals, for performing a NAND operation to generate a third output signal;
   a second set-reset latch, receiving said third output signal on a second CDN input, receiving said third QN output signal on a second PDN input, for performing set-reset latch operations to generate a second QN output signal;
   a second inverter, receiving said second QN output signal, for performing said inversion operation to generate a fourth output signal;
   a first flip-flop, receiving a first CLK input signal, a first D input signal, and said fourth output signal at a third CDN input, for performing flip-flop operations to generate a first Q output signal;
   a first buffer gate, receiving said first Q output signal, for outputting a delayed first Q output signal;
   a second flip-flop, receiving said first CLK input signal, said delayed first Q output signal on a second D input, and said fourth output signal on a fourth CDN input, for performing flip-flop operations to generate a second Q output signal;
   a first AND gate, receiving said first and second Q output signal, for performing logical AND operation to generate a first AND output signal;

a second buffer, receiving said first AND output signal, for generating a fifth output signal corresponding to a delayed first AND output signal;

a third buffer, receiving said fourth signal, for generating a sixth output signal corresponding to a delayed fifth output signal;

a third flip-flop, receiving said first CLK input signal and said sixth output signal on a third PDN input, for performing flip-flop operations to generate a third Q output signal and said third QN output signal; and a multiplexor, receiving a selection input signal, for sending one of the third Q output signal and data to the third D input of the third flip-flop based upon the selection input signal.

4. A method for generating a wake up signal based upon at least two input signals comprising the steps of:

receiving a first input signal from a first device and a second input signal from a second device, said first input signal being asynchronous;

resolving a conflict between said first and second input signals to identify a higher priority signal representing said input signal having a higher priority; and generating a wake up signal in response to said higher priority signal.

5. The method of claim 4, wherein said first device is one of a CPU and a pin.

6. The method of claim 4, wherein said second device is one of an ALU and a pin.

7. The method of claim 4, wherein the resolving step further comprises the steps of:

identifying the priority of said first and second signals; and generating an output signal corresponding to the higher priority signal.

* * * * *